United States Patent

[11] 3,560,718

[72] Inventor Arie Adriaan Spanjersberg
Leiderdorp, Netherlands

[21] Appl. No. 782,648
[22] Filed Dec. 10, 1968
[45] Patented Feb. 2, 1971
[73] Assignee De Staat Der Nederlanden, Ten Deze Vertegenwoordigd Door de Directeur-Generaal Der Posterijen Telegrafie En Telefonie
Hague, Netherlands
[32] Priority Dec. 31, 1963
[33] Netherlands
[31] 302795
Continuation-in-part of application Ser. No. 420,990, Dec. 24, 1964, now abandoned

[54] MARKED GRID READING AND TESTING DEVICE

10 Claims, 6 Drawing Figs.

[52] U.S. Cl. .......... 235/61.11; 178/23; 235/61.7
[51] Int. Cl. .......... G06k 7/00
[50] Field of Search .......... 35/48.2; 340/146.3, 174.1; 178/23.1; 235/61.115, 61.7, 61.603; 209/(Inquired)

[56] References Cited

UNITED STATES PATENTS

| | | | |
|---|---|---|---|
| 2,950,799 | 8/1960 | Timms | 235/61.11 |
| 2,997,697 | 8/1961 | MacAdam | 340/174.1 |
| 3,146,422 | 8/1964 | Greanias et al. | 340/146.3 |
| 3,274,337 | 9/1966 | Van Berkel | 178/23X |

*Primary Examiner*—Thomas A. Robinson
*Attorney*—Hugh A. Kirk

ABSTRACT: A device for reading marked areas on a grid on an information bearer comprising means for moving the bearer past a first reading means having a low sensitivity reader, storing and testing the results read for completeness, and then moving the bearer past a second reading means with a high sensitivity reader, and, if the first read results were not complete, storing and testing the reread results for completeness. The circuit of the reader which controls the device includes AND- and OR-gates, and cam-operated sequence switches for the successive operation of the reading stations, to each of which switches are connected delay devices and pulse shapers for controlling a single shift-register type memory or storing device and the completeness tester. This tester in turn operates separate triggers for (a) blocking the operation of the second or high sensitivity reader when the information stored in the memory or storing device has been tested to be complete as a result of the information read from the first or low sensitivity reader, and for (b) diverting the movement of the information bearer when the second or high sensitivity reader still tests the reread information to be incomplete.

FIG. I

INVENTOR.
ARIE A. SPANJERSBERG
BY
[signature]
ATTORNEY

DIRECTION OF SCANNING

INVENTOR.
ARIE A. SPANJERSBERG
BY Hugh A Kirk
ATTORNEY

INVENTOR.
ARIE A. SPANJERSBERG
BY Hugh A. Kirk
ATTORNEY

INVENTOR.
ARIE A. SPANJERSBERG
BY
ATTORNEY

MARKED GRID READING AND TESTING DEVICE

RELATED APPLICATION

This is a Continuation-in-Part of application of A. A. Spanjersberg application Ser. No. 420,990 filed Dec. 24, 1964, now abandoned, which is based upon the Netherlands priority Pat. application Ser. No. 302,795 filed Dec. 31, 1963.

BACKGROUND OF THE INVENTION

An information bearer with a marking grid of the type involved herein is known from applicant's copending application Ser. No. 330,824, filed Dec. 16, 1963, now Pat. No. 3,436,010 dated Apr. 1, 1969, see particularly FIG. 3.

A photoelectric reading device of the type involved herein is known from applicant's joint Application Ser. No. 82,495, filed Jan. 13, 1961, now abandoned, and refiled Feb. 11, 1965 as a Continuation-in-Part application Ser. No. 431,926, now Pat. No. 3,437,793 dated Apr. 8, 1969. The two reading stations of this prior photoelectric reading device are identical. For each of the stations there is a memory in which the reading result of a row of markings is recorded. If the readings from the two stations are identical, and if a test made by means of the testing device has shown that they satisfy the requirements set, they are accepted. These two reading stations have been provided to exercise a mutual supervision.

It has been proved in practice that the marks applied to the marking areas by the public-at-large are of an extremely varying quality. Some marks have been applied in dark ink, in addition to which there may be undesired disturbances in the shape of small blots or specks. Other registration bearers are marked in lighter inks, which marks only cause output voltages of the reading photocell similar to that of a disturbance to be ignored when made by a dark ink as mentioned before. This raises the problem of deciding to what sensitivity the reading device must be adjusted. A solution consists in having the device perform a first reading with a sensitivity allowing the perception of the dark marks, but not that of the disturbances. The registration bearers of the first kind are handled in this manner. Then those registration bearers having light markings are, for example, marked in the manner described in the British Patent No. 905,057. After that, the sensitivity of the reading device is increased and the information bearers with the marks of the second kind are read again. It has been found that only about half of all the information bearers can be dealt with in the first reading. In the case of two successive readings as described, many more information bearers can be dealt with, but the time required is considerably increased.

SUMMARY OF THE INVENTION

Accordingly, it is an object of this invention to provide a reading device equally capable of handling a much increased number of information bearers having both proper dark and light markings thereon, without an increase in the time for its passage through the device.

Another object is to provide a reading device which may be read the same information bearer twice without reversing its motion, or without changing its sequence.

Thus, this invention relates to a reading device, particularly a photoelectric reading device, for information bearers having a marking grid area. The reading device for this bearer comprises primarily two separate reading stations and one testing circuit to check the completeness of the markings in the grid, which markings are detected and recorded in a single memory circuit. This is obtained by having the two reading stations adjusted to different sensitivities and separated by a minimum distance equal to the dimension of a marking grid area measured in the direction of scanning. Thus when such an area first passes the station having the lowest sensitivity, the reading result stored in a memory is tested for completeness by a testing circuit. In the case of a correct result, this testing circuit blocks the memory for the reception of the reading result from the station having the greater sensitivity. On the other hand in the case of an incorrect result, it obliterates the reading result stored in the memory, after which this memory is ready for receiving the reading result from the second station, which result, in its turn, is tested for completeness by the testing circuit. If this second result is still incomplete the testing circuit may trigger a diverter gate to separate out that bearer. The sequence of operation of the two reading stations and their grid distance spacing may be controlled by cam-operated switches, whose cams are mechanically coupled to the means for feeding the information bearers past these stations. These switches in turn may control pulse shapers, and delay circuits for triggering the operation of the memory and the outputs from the completeness tester, respectively.

DESCRIPTION OF THE VIEWS

The above mentioned and other features, objects, and advantages, and a manner of attaining them are described more specifically below by reference to an embodiment of this invention shown in the accompanying drawings, wherein.

Figure 1:
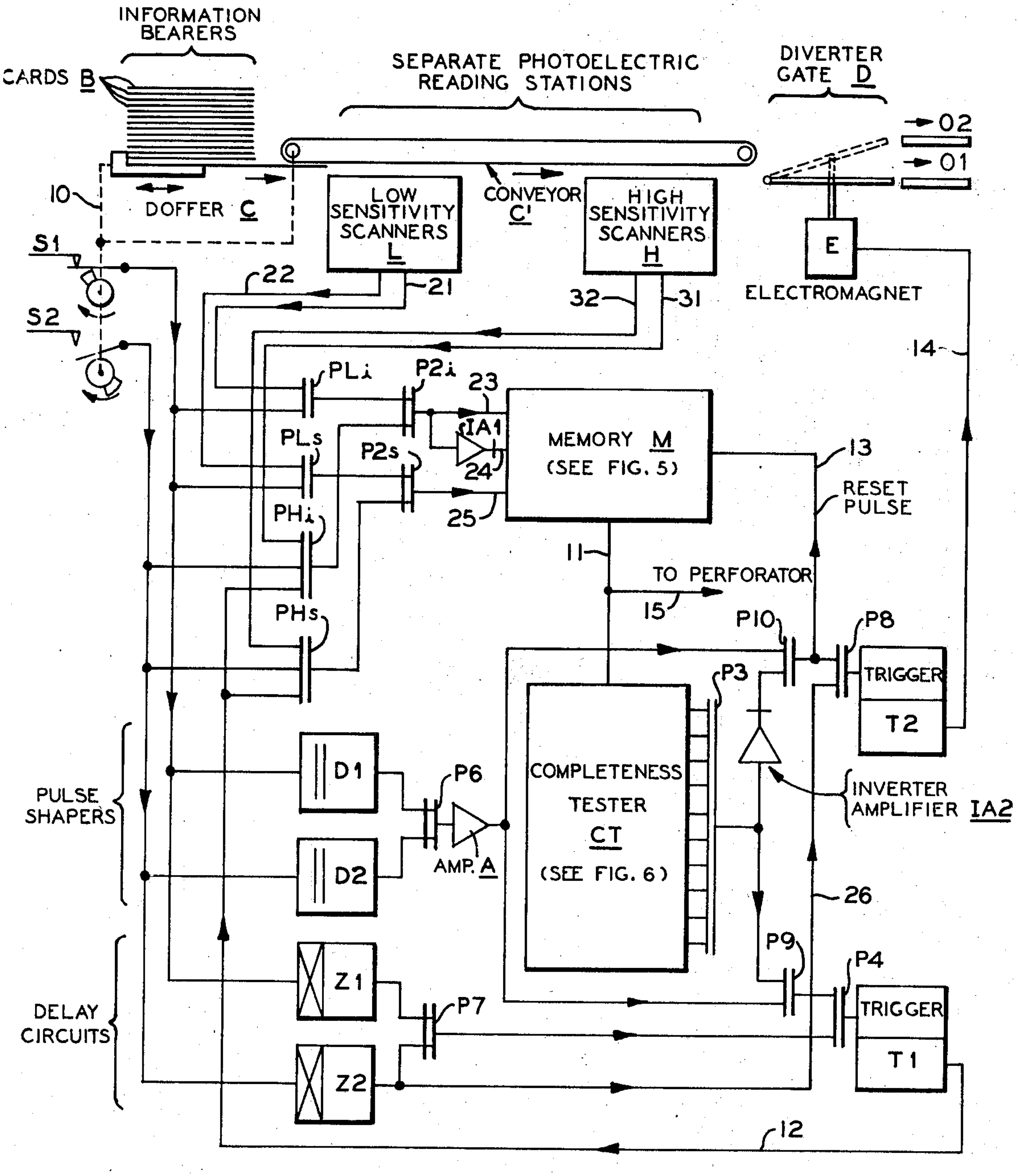
FIG. 1 shows schematically the apparatus of a reading device according to one embodiment of this invention, including the relative locations of a feeder for an information bearer or cards, two separate successive reading stations, a diverter gate, and a schematic block wiring diagram of a control circuit for the stations and diverter gate of the reading device.
Figure 2:
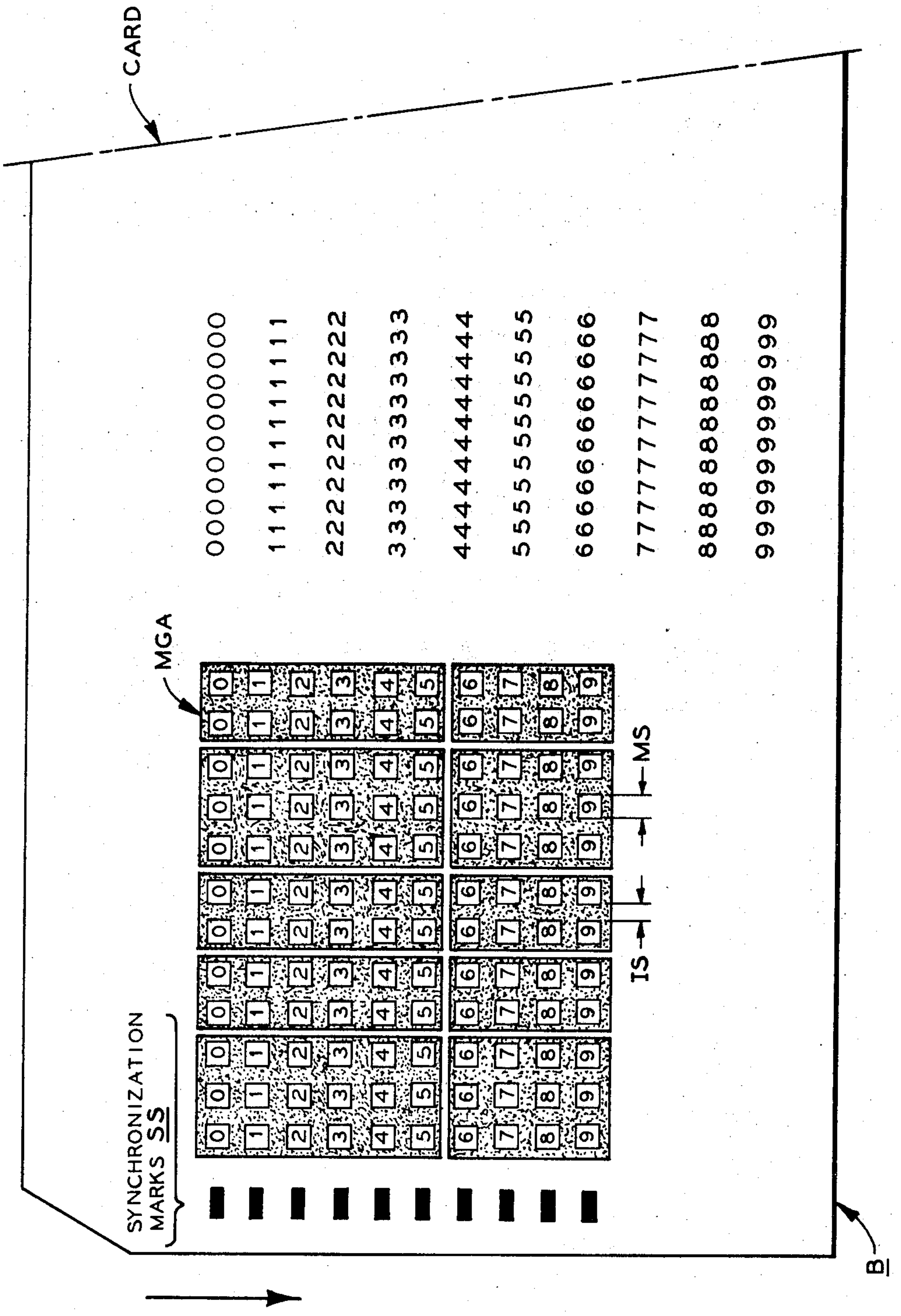
FIG. 2 is a portion of one type of a card which may be processed by the device of FIG. 1 showing a darkened grid or marking area and a numbered punching area.
Figure 5:
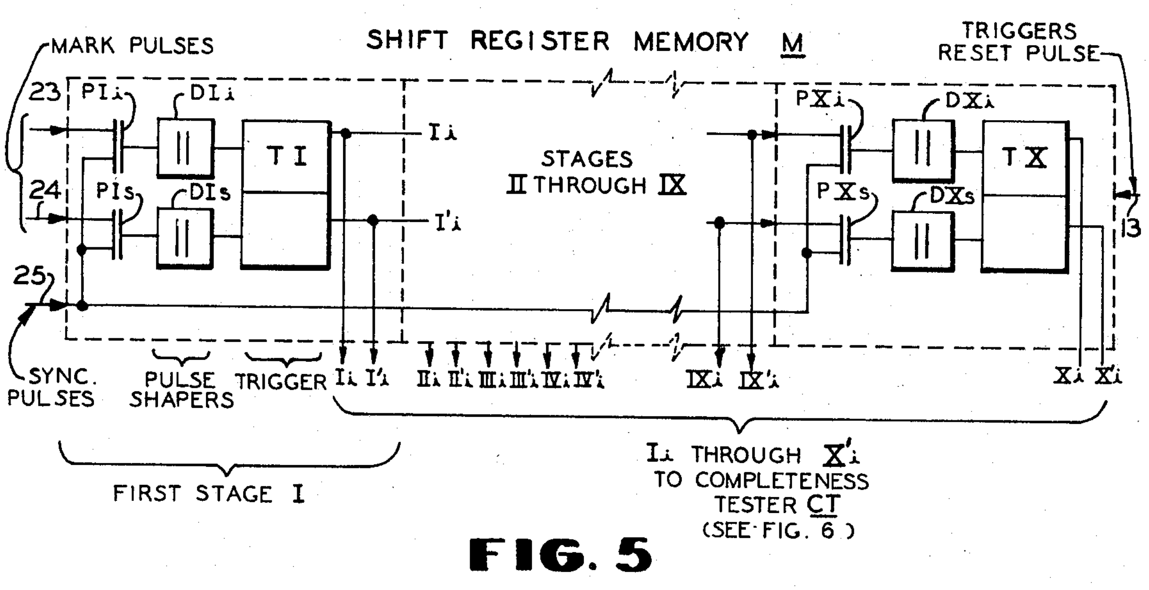
Figure 6:
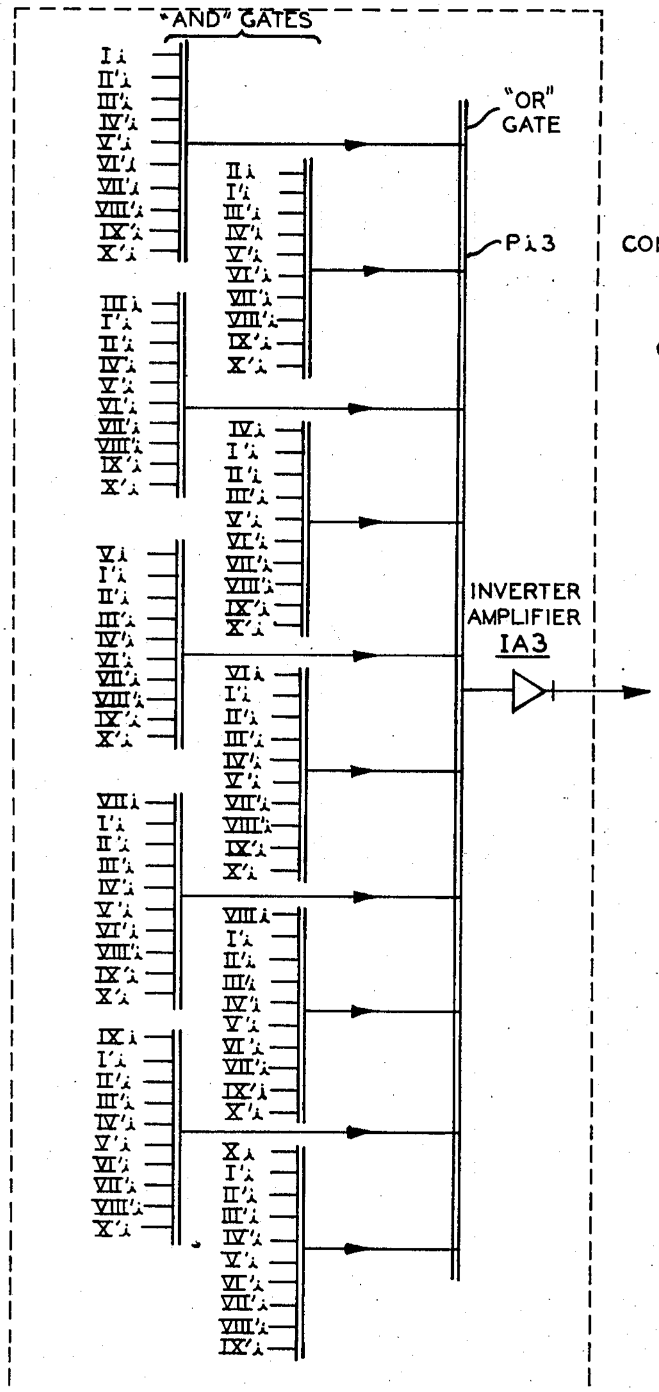

FIG. 5 is a detailed schematic block-wiring diagram of the first and last stages of a shift register which may be used for the memory circuit M shown in FIG. 1; and FIG. 6 is a detailed schematic wiring diagram of a completeness testing circuit for one column of numerals as shown on the bearer in FIG. 2, which circuit is repeated for each column of the grid to form the completeness tester CT shown in FIG. 1.

DETAILED DESCRIPTION OF A PREFERRED EMBODIMENT OF THE INVENTION

I. THE APPARATUS IN GENERAL (FIGURE 1)

In FIG. 1, a stack of information bearers or cards B are moved one by one, such as by means of a doffer C to a first reading station L of low sensitivity and then on by means of a conveyor belt C′ to a spaced and separate high sensitivity reading station H, and thence normally past a diverter gate D to the first and normal outlet channel O 1. If neither the low sensitivity or the high sensitivity reading stations L and H records complete information from the bearer B, then the bearer is diverted by the diverter gate D via its dotted line position to another outlet channel O 2.

The difference between the low and high sensitivity scanners or readers L and H may be achieved by applying a brighter illumination to the document at the high sensitivity station H than that at the low sensitivity station L, or if desired, the results from the high sensitivity scanner or reader H may be amplified more than the results of the low sensitivity scanner or reader L.

Generally speaking the circuits connected to the separate photoelectric reading stations L and H and the diverter gate D include a pair of cam switches S 1 and S 2 mechanically connected, shown by dotted lines 10, with the movement of the bearers B by doffer C and conveyor C′, so as to connect the information read in the low sensitivity and high sensitivity stations L and H sequentially to a single memory or storage circuit M. This connection also includes electrical conductors to AND-gates PL*i* and PL*s* and PH*i* and PH*s*, which are connected to OR-gates P2*i* and P2*s* connected to the memory M. This memory M comprises a shift register with stages corresponding to the number of marking spaces on the bearer B. Connected to this memory circuit M via a plurality of conductors 11 is a completeness tester circuit CT which determines whether one and only one marking space in each column of marking spaces in the grid on the bearer B is marked.

If the completeness tester CT determines that the memory circuit M has a correct signal stored therein, a potential is applied from its output AND-gate P3, through AND-gate P9 with a reshaped pulse from the shaper D1 or D2 controlled by the cam switches S1 or S2, respectively, and through AND-gate P4 controlled by a delayed pulse from the switch S1 to operate a trigger T1. This trigger T1 then, via conductor 12, applies a different potential to the AND-gates PH*i* and PH*s* so that they block the information read in the second and high sensitivity reading station H so that this information will not be stored in the memory M, nor will it have to be tested again for completeness.

On the other hand, if the completeness tester CT does not detect complete or correct information from the low sensitivity reader L, then trigger T1 is not so operated, and a potential also passes from the output of the completeness tester through the inverter amplifier IA2 and AND-gate P10 via the conductor 13 to reset the memory M so that the information on the bearer B can be read again in the high sensitivity tester H and its signals passed through the gates PH*i* and PH*s* to restore the read signals in the memory M and test them again in the completeness tester CT.

In the event the stored results from the high sensitivity tester in the memory M has been tested now to be complete, then the operation of trigger T1 has no effect, and the information bearer B passes normally over the full-line position of the diverter gate D into the outlet O1.

If on the other hand, the completeness tester CT tests the second information results from the same card or bearer B, that is the information from the high sensitivity reading station H which have been recorded in the memory M, to be incomplete or incorrect again, then the trigger T2 is energized from the output of the completeness tester CT through gate P10 controlled by a gate pulse from the cam switch S2 via delay circuit Z2. This trigger then transmits a potential via conductor 14 to operate an electromagnet E which moves the diverter gate D into the dotted line position shown in FIG. 1 to divert the bearer B to the outlet O2. Such a diverted information bearer is not yet suited for reading in the reading apparatus of this invention, and it will then have to be checked, such as visually by an operator, to see if it can be remarked properly and put through the reading apparatus again, or a new information bearer has to be made out.

If desired, the reading apparatus of this invention may be combined with a sorting station as well as a coding station (not shown), and the information stored in the memory M may be detected through a bypass conductor 15 to operate a perforator for the information bearer B at an additional station (not shown) beyond the output O1 to record more definitely on the bearer the information that was marked thereon by a person from the general public. Furthermore, this coded information or the perforations on such a bearer may be read a third time and its results may be compared with the correct or complete information from the memory M, as a further accuracy check.

II. THE INFORMATION BEARER (FIGURE 2)

Referring to FIG. 2, there is shown a part of one form of an information bearer or card B which may be read by the device or apparatus of this invention. This bearer B has a marking grid MGA printed thereon which comprises 12 columns of marking spaces MS formed into ten rows of digitally numbered marking spaces to be marked by the general public. It is the markings in these spaces MS which are to be examined, together with a column of black synchronization marks SS (see left side of grid MGA) corresponding to each row of spaces MS in the grid MGA. These marking spaces MS and the distances or intervals IS between adjacent ones of them in the grid MGA have been shown to be equal. These intervals IS must have such a color, indicated herein by stippling, so that unmarked marking spaces MS and intervals IS both have the same effect upon the photocell or other scanning means at the reading stations L and H. The symbols "0", "1", "2", "3", "4" up through "9" corresponding to the various rows of marking spaces MS in each column, can be printed in these spaces MS in the same color as that indicated for the intervals IS for the background of the grid MGA in FIG. 2. For example, the information bearers which produce this effect in the photocell scanners may have the color of a partially saturated red, so that the base of the grid MGA and the Arabic digital numbers in the spaces MS are in this color. The synchronization marks SS, however, are not in this color, but are black so that they always can be easily detected by the scanning means or photocells. Thus the photocell scanners detect all marks that are not a red color, by not producing an output current during the scanning of dark marks other than red on the bearer B which may be made thereon by the general public. This reduction or cutoff in the output of the scanners is easily detectable even if the marking spaces MS have been only partially filled in or marked by means of a light blue ink.

Also shown on this card or bearer B to the right of the grid MGA, may be similar rows and columns of Arabic digits, which digits may be punched out by a perforator (as mentioned above) at another station (not shown).

Information bearers B of the type shown in FIG. 2 may be for indicating amounts of money and numbers of accounts, such as on a post check commonly used in connection with the postal systems of European countries, which bearers B are marked by the general public.

III. THE SCANNERS (FIGURE 3)

Figure 3:
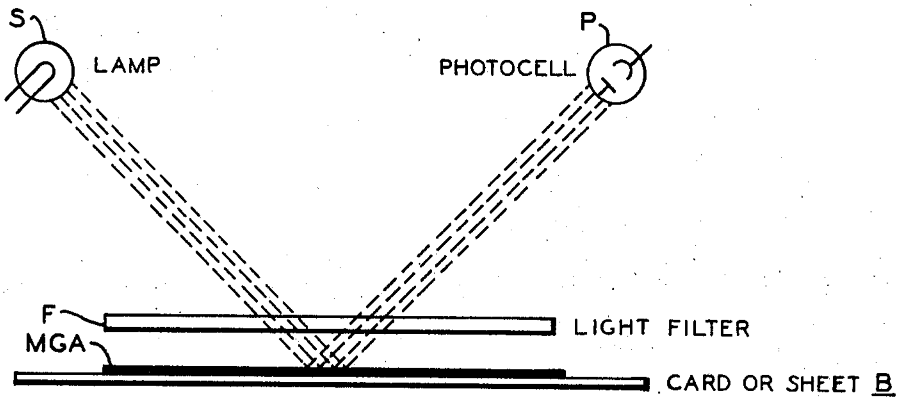
FIG. 3 is a schematic diagram of one embodiment of how a grid area on a sheet as shown in FIG. 2 may be scanned photoelectrically through a light filter means.

In FIG. 3 there is schematically shown one of a plurality of scanners which may be used in the reading stations L and H. This scanner comprises a lamp or light source S which emits white light in the direction of the dotted lines, passes through a light filter F, and reflects against the grid surface MGA on the information card or bearer B, and back through the filter F to a photocell P.

As stated above, if the base of the marking grid MGA and the numbers in the marking spaces MS thereon are in a partially saturated red and the light S is white, the filter medium F should only permit red components of the white light to pass. Thus when the red component of the light S is reflected from a white surface of the information bearer B or from the partially saturated red part of its mark grid area MGA, the light reflected and detected by the photocell P is always red and of the same intensity. However, black marks on the surface of the bearer B which absorb light, such as the synchronization marks SS and marks made with a black or blue pencil or pen on the grid MGA, do not reflect this red light and thus produce and impulse in the output circuit of the photocell P when scanned, as indicated by the dips *m*1, *m*2, and *m*3 in the wave form W illustrated in FIG. 4.

Photocells P which are sensitive to this red light may comprise a germanium or silicon semiconductor, which is sensitive in the red and infrared parts of the spectrum. This infrared part of the spectrum may be easily absorbed by the filter F. It should be understood, however, that other colors besides red may be used with corresponding filters and properly chosen color sensitive solid state photocells P to produce the same uniform effect for an unmarked grid on an information bearer B.

Referring again to FIG. 4, the wave form W may correspond to the voltage output of the photocell P as it scans a column of marking spaces in the grid MGA, in which a desired mark produces the dip *m*1 and undesirable dark spots or ink specks produce the dips *m*2 and *m*3. Since the undesired dark spots *m*2 and *m*3 do not cut out as much light as the desired mark *m*1, they do not reach the sensitivity level 1 for the reading device, and only the desired mark *m*1 is detected and transmitted on to the memory circuit M. Thus the choice of the threshold level 1 with respect to the signal amplitude desired in the wave W determines the sensitivity of the scanner. On the other hand a grid MGA can have its desired marks made so small and with blue ink that the impulse detected in the low sensitivity reader L may only have the same amplitude as the ink specks *m*2 and *m*3 shown in FIG. 4, while undesired marks are hardly detected at all. In such a case, if the amplitude of the output signal wave is increased, such as by a higher sensitivity reading device at station H, a signal wave W then will be produced and the desired mark will then have an amplitude great enough to cross the threshold level 1 as though the mark had been made darker and/or larger.

However, if the undesired specks or dots are as dark as the blue ink or desired marks made on the grid MGA, and they are in the same column on the grid as the desired mark, then the testing circuit CT will reject the bearer or card B and operate the diverter gate D to bypass it as not passing the test even under the high sensitivity scanner. This rejected card then may be visually examined by an operator to try to determine which of the marks thereon were manually made and which are unintentional, and if such can be done, this rejected card can be remarked properly and put through the reading apparatus again, otherwise it will have to be returned to the person who improperly marked it.

Figure 4:
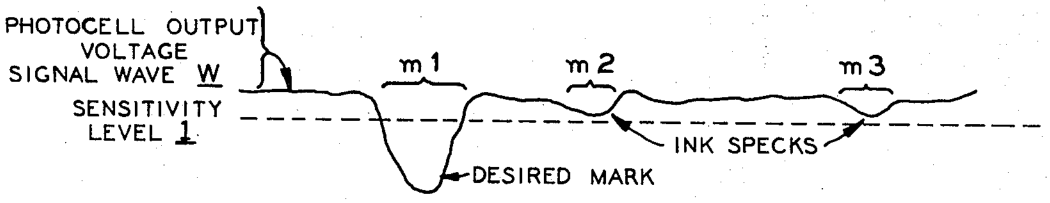
FIG. 4 is a wave form of a possible voltage output of a photocell scanner which scans a column in a marked grid on an information bearer as shown in FIG. 2.

In practice the situation is somewhat more complicated than that disclosed and described in combination with FIG. 4 above, in that interfering impulses or "noise" is not only caused by ink particles or specks, but also by other influences such as the quality of the paper in the bearer B, the flatness of the paper of bearer B upon which the marks are made, and the distance of the scanner from the paper surface. Thus the manner in which the bearer B is transported and presented to the reading stations L and H also affects the "noise" in the output circuit signal W of the scanning photocells P. Accordingly, there are other advantages, than just variations in the darkness of the markings, in providing two separate reading stations L and H for successively reading each bearer B.

IV THE CONTROL CIRCUITS FIGURES 1, 5 and 6) -th

The circuits controlled by the reading devices L and H will be described for the scanning of just one column on the grids MGA, hereinafter called the *i*-th column, and it is to be understood that a repetition of this circuit must be repeated for each of the scanning tracks or columns on the grid in order to provide a complete recording and testing circuit for the bearer shown in FIG. 2.

When this *i*-th column of the marking grid MGA is scanned by a photocell P in the low sensitivity reading station L, or in the high sensitivity reading station H, the synchronization marks SS are simultaneously scanned by another photocell, so that the separate output signals are obtained from the reading of these two columns which signals are separately conducted through conductors 21 and 22 from station L and conductors 31 and 32 from station H, with conductors 21 and 31 being for the marked information and conductors 22 and 32 being for the synchronization pulses from the marks SS. The information and synchronization signals from the first and low sensitivity reader L are respectively conducted to the AND-gates PL*i* and PL*s*, while these corresponding signals from the second and high sensitivity reader H are respectively conducted to AND-gates PH*i* and PH*s*. To the AND-gates PL*i* and PL*s* are also connected a source potential from cam switch S1 to cause these gates to pass the signals read only when the car or bearer B is being read by the low sensitivity reading station L. Similarly, cam switch S2 connects such a potential to the AND-gates Ph*i* and PH*s* only when the bearer B is being read by the high sensitive reading station H. These latter AND-gates PH*i* and PH*s* also are connected to a third conductor 12 which keep these gates open unless the trigger T1 is operated by the completeness tester CT testing the first read and recorded information to be incomplete or in error.

The outputs of the AND-gates PL*i*, PL*s*, PH*i* and PH*s* are separately connected to two OR-gates P2*i* and P2*s*, the former being for the information marks and the latter being for the synchronization marks. The output conductor from the OR-gate P2*i* is also connected to an inverter amplifier IA1 so that three separate input conductors 23, 24 and 25 from these OR-gates are connected to the first stage or step of the shift register which composes the memory circuit M and is shown in more detail in FIG. 5.

IV - (a) THE MEMORY CIRCUIT (FIGURE 5)

Referring now to FIG. 5, the opposite polarity information signals or mark pulses from the OR-gate P2*i* are connected via conductors 23 and 24 to the first stage I of the *i*-th shift register in the memory circuit M, while the sync pulses or signals are connected thereto via conductor 25. The former two conductors 23 and 24 are connected to AND-gates PI*i* and PI*s* together with the conductor 25, and any outputs of these gates are then passed through the pulse shapers DI*i* and DI*s* to the two inputs of the trigger TI. This comprises the first stage I of the shift register for the *i*-th column, which shift register herein is composed of ten successive stages I through X. The second or next stage II is operated by the outputs I*i* and I'*i* from this trigger TI, which outputs also are connected via cable 11 to the completeness tester CT. Thus each sync pulse for each of the ten rows of marking spaces MS on the grid MGA, shifts the information pulses to the next successive stage in the memory M, and when the desired mark is detected, that particular stage is triggered to give a reverse potential output from its two output terminals opposite the output potentials from all the other stages of that shift register for that particular column. Thus the sync pulses successively operate each similar stage I through X of the shift register, the last stage X being shown to have its input AND-gates PX*i* and PX*s*, a pair of pulse shapers DX*i* and DX*s*, and the final trigger TX with output conductors X*i* and X*i* .

IV - (b) THE COMPLETENESS TESTER (FIGURE 6)

As soon as the information read from the card or bearer B at the low sensitivity reading station L is stored in the shift registers for each column in the memory M, the output from each stage of the register is connected by separate conductors via cable 11 in FIG. 1 to the separate inputs of the AND-gates in the completeness tester circuit CT. This tester CT (see FIG. 6) comprises ten AND-gates each with ten inputs for each stage of every shift register in the memory M, which AND-gates for each register are connected to an OR-gate P*i*3. Each of these ten AND-gates for each shift register has a different combination of nine primed inputs from the corresponding outputs of the ten trigger circuits TI through TX in the memory, and one not-primed input for that one and only one stage in each register which should be operated by one marking pulse or information signal from each column on the grid. Thus in order for a proper completeness test to be made one and only one of the AND-gates shown in FIG. 6 will be conductive for that *i*-th column. If none or two or more spaces MS have been marked in the *i*-th column on the grid MGA, then none of the AND-gates will operate in that portion of the tester circuit CT shown in FIG. 6, so that no potential will be applied to the OR-gate P*i*3 and thence through the inverter amplifier IA3 to the output AND-gate P3 shown at the output of the completeness tester CT in FIG. 1.

Accordingly, when a card or bearer B has its grid MGA filled in properly, that is only one space in each column is marked, so that even if there is no figure to be indicated for a column, the "0" position or marking space in that column is marked, the card or bearer will be accepted by the apparatus of this invention and not diverted. However, if such is not the case then neither the low nor the high sensitivity readers L or H will properly record the information from the card, and it will be diverted by the operation of the diverter gate D as described above.

Referring back now to FIG. 1, if the completeness tester CT tests what is recorded in the memory circuit M to be complete or correct, it passes a potential from the gate P3 to AND-gate P9. This gate P9 is then opened when a pulse passes through the pulse shapers D1 or D2 and its output OR-gate P6 and amplifier A. Then a potential is applied to the AND-gate P4 which is not opened until the proper delay pulse from the delay circuit Z1 or Z2 and OR-gate P7 to control the trigger T1 to block via conductor 12 the recording in the memory M of the read information signals from the second or high sensitivity reader H.

In the event an incorrect or incomplete information signal has been recorded in the memory M, the completeness tester does not produce a potential at its output of AND-gate P3 to open AND-gate P9, but it does permit an inverted potential from the inverter amplifier IA2 to open the AND-gate P10 when an output pulse from the pulse shaper circuit D1 or D2 is applied thereto, which then produces a pulse for resetting the memory circuit M via conductor 13. Then if an incompleteness test occurs again after the second read information from the bearer from the high sensitivity reading station H has been tested, the delayed pulse from the second delay circuit Z2 via conductor 26 then opens gate P8 to operate the trigger T2 to operate the electromagnet E for moving the diverter gate D so that the incompletely or inaccurately marked and/or read bearer will be diverted into the output O2 as previously mentioned.

I claim:

1. A device for reading marked areas on a grid on an information bearer (B), comprising:
   a. a low sensitivity photoelectric reading station (L),
   b. a high sensitivity photoelectric reading station (H),
   c. means (C, C') to move said information bearer successively past said reading stations,
   d. means (M) connected to said reading stations for storing first the information read from said bearer by said low sensitivity reading station and then by said high sensitivity reading station,
   e. means (CT) connected to said storing means for testing the information stored in said storing means for completeness immediately after it is stored therein,
   f. means (T1) connected to said testing means for blocking the storing of said read information from said high sensitivity reading station when the first stored information from said low sensitivity reading station has been tested to be complete, and
   g. means (13) for obliterating said stored information from said storing means after it has been tested to be incomplete.

2. A device according to claim 1 including:
   h. means for diverting said bearer after it passes said high sensitivity reading station when said testing means has tested the stored information read from said high sensitivity reading station to be incomplete.

3. A device according to claim 1 wherein said means for moving said information bearer includes cam-operated switches (S1, S2) for successively connecting the two reading stations to said storing means.

4. A device according to claim 3 wherein said testing means includes separate pulse-shaping circuits (D1, D2) responsive to said switches for controlling the output of said testing means.

5. A device according to claim 3 wherein said switches control separate delay circuits (Z1, Z2) for operating said blocking means and said obliterating means in order to compensate for the time for operating said testing means.

6. A device according to claim 1 wherein said blocking means comprises a trigger circuit.

7. A device according to claim 1 wherein said storing means comprises a shift register (I through X).

8. A device according to claim 1 wherein said completeness testing means comprises a plurality of one and only one type AND-gates.

9. A device according to claim 1 wherein the markable areas (MS) on said grid on said information bearer are arranged in a plurality of columns and rows at right angles to each other, and wherein a synchronization mark is provided opposite each row of said markable areas.

10. A reading device for an information bearer wherein said bearer comprises: at least one column of markable areas adjacent a column of synchronization marks, one for each area; said device comprising:
   a. means for moving said bearers successively through said device in the direction of said column,
   b. a first low sensitivity scanning means for producing impulses corresponding to marks in said column,
   c. a second high sensitivity scanning means for producing impulses from marks in said column,
   d. a memory means connected to both said scanning means for first storing the impulses from said first scanning means and then storing the impulses from said second scanning means,
   e. a completeness tester connected to said memory means for checking that said memory has one and only one impulse stored for each column after a bearer is scanned by said first scanning means,
   f. means connected to said completeness tester for preventing the response of said memory means to the impulses from said second scanning means when said memory means has been tested to be complete by said completeness tester,
   g. means connected to said completeness tester for resetting said memory means and permitting the response of said memory means to the impulses from said second scanning means when said memory means has been tested to be incomplete by said completeness tester, and
   h. means connected to said completeness tester for diverting said bearer from its normal movement through said device when said memory means has been tested to be incomplete by said completeness tester in response to impulses from said second scanning means.

(P 169/1

PO-1050
(5/69)

UNITED STATES PATENT OFFICE
CERTIFICATE OF CORRECTION

Patent No. 3,560,718 Dated Feb. 2, 1971

Inventor(s) Arie Adriaan SPANJERSBERG

It is certified that error appears in the above-identified patent and that said Letters Patent are hereby corrected as shown below:

Column 1, line 58, delete "be"; column 5, line 71, "car" should read -- card --; column 6, line 42, "Xi" (second occurrence) should read -- X'i -- .

Signed and sealed this 25th day of May 1971.

(SEAL)
Attest:

EDWARD M.FLETCHER,JR.
Attesting Officer

WILLIAM E. SCHUYLER, JR.
Commissioner of Patents